United States Patent
Los

[15] 3,671,573

[45] June 20, 1972

[54] SUBSTITUTED D-HOMOESTRA TETRAENE AND PENTAENE COMPOUNDS

[72] Inventor: Marinus Los, Edinburg, Scotland

[73] Assignee: American Cyanamid Company, Stamford, Conn.

[22] Filed: June 17, 1970

[21] Appl. No.: 47,165

Related U.S. Application Data

[63] Continuation-in-part of Ser. No. 708,498, Feb. 27, 1968, Pat. No. 3,565,958.

[52] U.S. Cl.................260/488 CD, 260/340.9, 260/345.9, 260/346.2 M, 260/491, 260/571, 260/576, 260/586 H, 260/586 R, 260/590, 260/613 R, 424/311, 424/331, 424/341

[51] Int. Cl......................................C07c 49/76, C07c 69/14
[58] Field of Search............260/488 BD, 590, 613 R, 586 H

[56] References Cited

OTHER PUBLICATIONS

Chem. Abstracts; 65:15446d
Chem. Abstracts; 67;90997r

*Primary Examiner*—Lorraine A. Weinberger
*Assistant Examiner*—Vivian Garner
*Attorney*—Ernest Y. Miller

[57] ABSTRACT

This invention relates to substituted D-homoestra tetraenes and pentaenes useful in the synthesis of other D-homosteroids. The latter steroids are useful as estrogenic agents in the treatment of laboratory and domestic animals.

6 Claims, No Drawings

SUBSTITUTED D-HOMOESTRA TETRAENE AND PENTAENE COMPOUNDS

This application is a continuation-in-part of my application Ser. No. 708,498, filed Feb. 27, 1968, now U.S. Pat. No. 3,565,958.

BRIEF SUMMARY OF THE INVENTION

The present invention relates to steroid-like compounds having a formula selected from the group consisting of

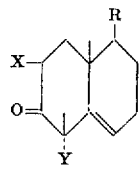

where R is a member selected from the group consisting of t-butoxy, ethylenedioxy, tetrahydropyranyloxy, oxo and hydroxyl; X is selected from the group consisting of

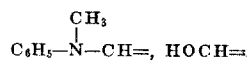

and H and Y is selected from the group consisting of

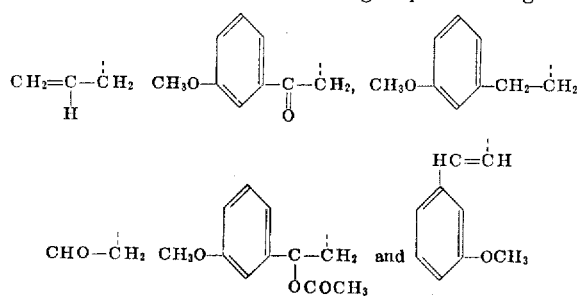

(B)

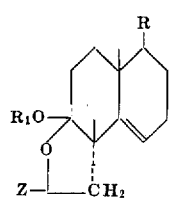

wherein R is as described above, $R_1$ is selected from the group consisting of H and loweralkyl ($C_1$-$C_4$) and Z is selected from the group consisting of -$CH_2OH$ and

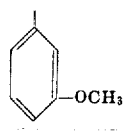

compounds within the scope of these generic formulas A and B are hereinafter disclosed in Sheets I and II of the Synthesis Diagrams. They include formulae II, III and V through XVII referred to in said diagram and in the specification and examples.

(C)

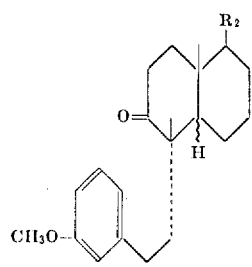

where $R_2$ is selected from the group consisting of oxygen, and hydroxyl and hydrogen is either cis or trans to the potential $C_{13}$ methyl described hereinafter. Compounds of the following formulae D through G are directed to formulae XVIII through XXXI on the sheets II and III of the Synthesis Diagrams hereinafter.

(D)

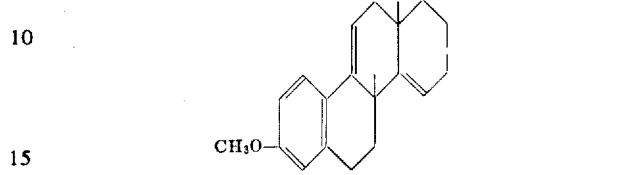

where $R_3$ is selected from the group consisting of oxo, hydroxyl and acetoxy.

(E)

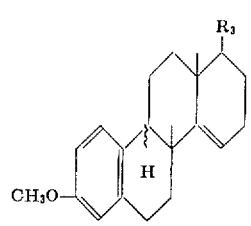

where $R_3$ is as described above.

(F)

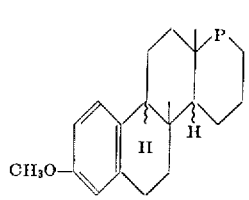

where P is

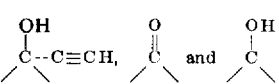

where the $C_{14}$ hydrogen is cis or trans to the $C_{13}$ methyl group.

(G)

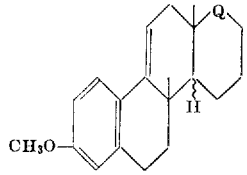

where Q is selected from the group consisting of

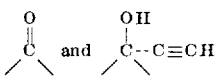

and hydrogen is cis or trans to the $C_{13}$ methyl group.

PREFERRED EMBODIMENT OF THE INVENTION

The compounds of the present invention can be synthesized from the starting materials identified by Formulas (I) and (IV) on the Synthesis Diagram, sheet one, hereinafter. In these formulae and those proceeding from said starting materials and graphically illustrated on Synthesis Diagram, sheets one and four, R represents a member selected from the group consisting of t-butoxy-(-O-C-($CH_3$)$_3$,) ethylenedioxy

and tetrahydropyranyloxy

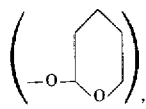

$R_1$ is hydrogen or lower alkyl, such as methyl, ethyl, propyl, isopropyl or the like and $R_2$ is oxygen or hydroxyl.

Briefly, the enedione having the formula

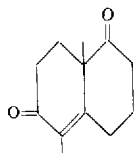

can be converted to the Formula (VI) compound wherein R is ethylenedioxy by treatment thereof with excess ethylene glycol and p-toluenesulfonic acid in an inert solvent such as benzene at an elevated temperature. Reaction of the thus formed monoketal with ethylformate and an alkali metal methoxide gives the hydroxymethylene ketone which, when treated with N-methylaniline yields the formula (I) compound wherein R is ethylenedioxy.

Treatment of the above-identified enedione with an alkali metal borohydride in the presence of a lower alkanol gives the naphthalenone corresponding to Formula (IV) wherein R is hydroxyl. The alcohol is then dissolved in methylene chloride and the solution treated with isobutylene in the presence of an acid catalyst to obtain the Formula (IV) compound wherein R is t-butoxy. The corresponding tetrahydropyranyloxy compound is made from the alcohol by dissolving the same in tetrahydrofuran and treating the formed solution with the dihydropyran containing phosphorus oxychloride. Preparation of Formula (I) compounds wherein R is t-butoxy or tetrahydropyranyloxy is then achieved in the same manner as described above for the Formula (I) compound in which R is ethylenedioxy. This involves preparation of the formyl compound and treatment thereof with N-methylaniline.

The allyl compounds (II) are obtained by alkylation of the N-methylanilinomethylene Compound (I) with an allyl halide such as allyl bromide. Hydrolysis of (II) under strongly basic conditions then gives the desired unblocked ketone (III) which, when ozonized, yields by selective cleavage of the allyl double bond the corresponding aldehyde (VI). The unblocked ketone (III) can also be obtained directly from the enone (IV) by treatment of (IV) with a strong base such as potassium t-butoxide or sodium hydride in an inert solvent such as t-butanol or dimethoxyethane followed by allyl bromide at an elevated temperature. Reaction of the thus formed product (III) in tetrahydrofuran with an alkali metal chlorate and osmium tetroxide gives the hemiketal (V) which is converted to the aldehyde (VI) by reaction with an alkali metal periodate and further treatment of the aldehyde (VI) with m-methoxyphenyl magnesium bromide gives the hemiketal (VII) ($R_1$=H) in good yield.

The hemiketal (VII) is also prepared from the starting material (I) by the route involving reaction of the anion of (I) with m-methoxyphenacyl bromide, preferably at about 0° C. to obtain the anilino compound (VIII) which, on hydroxysis in strong base gives the unblocked ketone (X). The reaction is preferably run at an elevated temperature in a lower alkylene glycol. If the reaction is terminated after a short period of reflux about 1 to 3 hours, a major portion of the product obtained will be the formyl compound (IX), however, if the reaction is run for approximately 6 hours, the unblocked ketone (X) is obtained in high yield. Reduction of this latter compound with hydrogen in acetic acid and a catalyst such as palladium gives the ketone (XI). The reaction is preferably run at an elevated temperature between about 50° and 90° C. and at a super atmospheric pressure. Acid hydrolysis of the thus formed product (XI) yields the diketone or ketoalcohol (XV). The ketone (XI) may also be obtained from the hemiketal (VII) by reduction of the same with hydrogen and a palladium catalyst in acetic acid. In addition to the previous route described for the preparation of (VII), such product can be obtained by catalytic reduction of the diketone (X). When this product (VII)

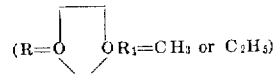

is then hydrolyzed with aqueous acetic acid at an elevated temperature the hemiketal (XII) is formed. When (VII) (R=t-butoxy or tetrahydropyranyloxy $R_1$ = H, $CH_3$ or $C_2H_5$) is hydrolyzed by mineral acid, then (XVI) is the product. When the compound (XII) is then subject to treatment with hot acetic acid-acetic anhydride mixture the diketone (XIII) is formed. This product is also obtained when (VII) (R=ethylenedioxy and $R_1$ is H or $CH_3$) is treated with acetic acid and acetic anhydride giving the acetoxyketone which is hydrolyzed to the diketone (XIII) in aqueous acetic acid. Conversion of the diketone (XIII) to the trans-styrene (XIV) is accomplished by reaction thereof with a strong acid such as p-toluene sulfonic acid at an elevated temperature in an inert solvent. Hydrogenation of the trans-styrene (XIV) yields the enedione (XV) ($R_2$==0) identical with that formed by acid hydrolysis of (XI) (R=ethylenedioxy). When the hemiketal (XVI) is reduced with hydrogen in the presence of a catalyst (XV) ($R_2$=hydroxyl) is obtained.

The enedione XV ($R_2$=oxo) is then reduced with sodium borohydride to the unsaturated keto alcohol (XVII). Further reduction of (XVII) with hydrogen in the presence of a paladium catalyst yields the keto alcohol (XVIII) which is readily oxidized to trans-dione (XIX) by mild oxidation with Jones' reagent. Cyclization of (XIX) by mineral acid at an elevated temperature gives the D-homo steroid (XX). Reaction of (XX) with acetylene in the presence of a strong base in an inert solvent then yields the estrogenically active ethynyl alcohol (XXXI). Catalytic reduction of ketone (XX) using hydrogen and a palladium catalyst yields the ketone (XXIX) which when treated with acetylene in the presence of a strong base gives the estrogenically active ethynyl alcohol (XXX).

This estrogenically active compound (XXX) can also be obtained from the diketone (XV) by a process involving treatment thereof with a strong mineral acid at an elevated temperature. The reaction is preferably carried out in a lower alkanol and gives the D-homo ketone (XXI) which is readily reduced to the corresponding alcohol (XXII) using an alkali metal borohydride. Treatment of the thus formed product with acetic anhydride then yields the diene (XXIII) which is catalytically reduced to the D-homo acetate (XXIV). Refluxing of the prepared product in a lower alcohol in the presence of strong base gives the unsaturated alcohol (XXV) which can be reduced catalytically with hydrogen in the presence of palladium to give the alcohol (XXVI). Mild oxidation of this product with Jones' reagent yields the ketone (XXIX) which is then converted to the estrogenically active compound (XXX) by the method heretofore described. Reduction of the endione (XV) with hydrogen in the presence of a catalyst gives the cis naphthalenedione (XXVII) which when treated with hydrogen fluoride gives the estrogenically active 14β-D-homoketone (XXVIII).

The following Synthesis Diagrams illustrate structurally the present compounds.

SYNTHESIS DIAGRAM
Sheet I
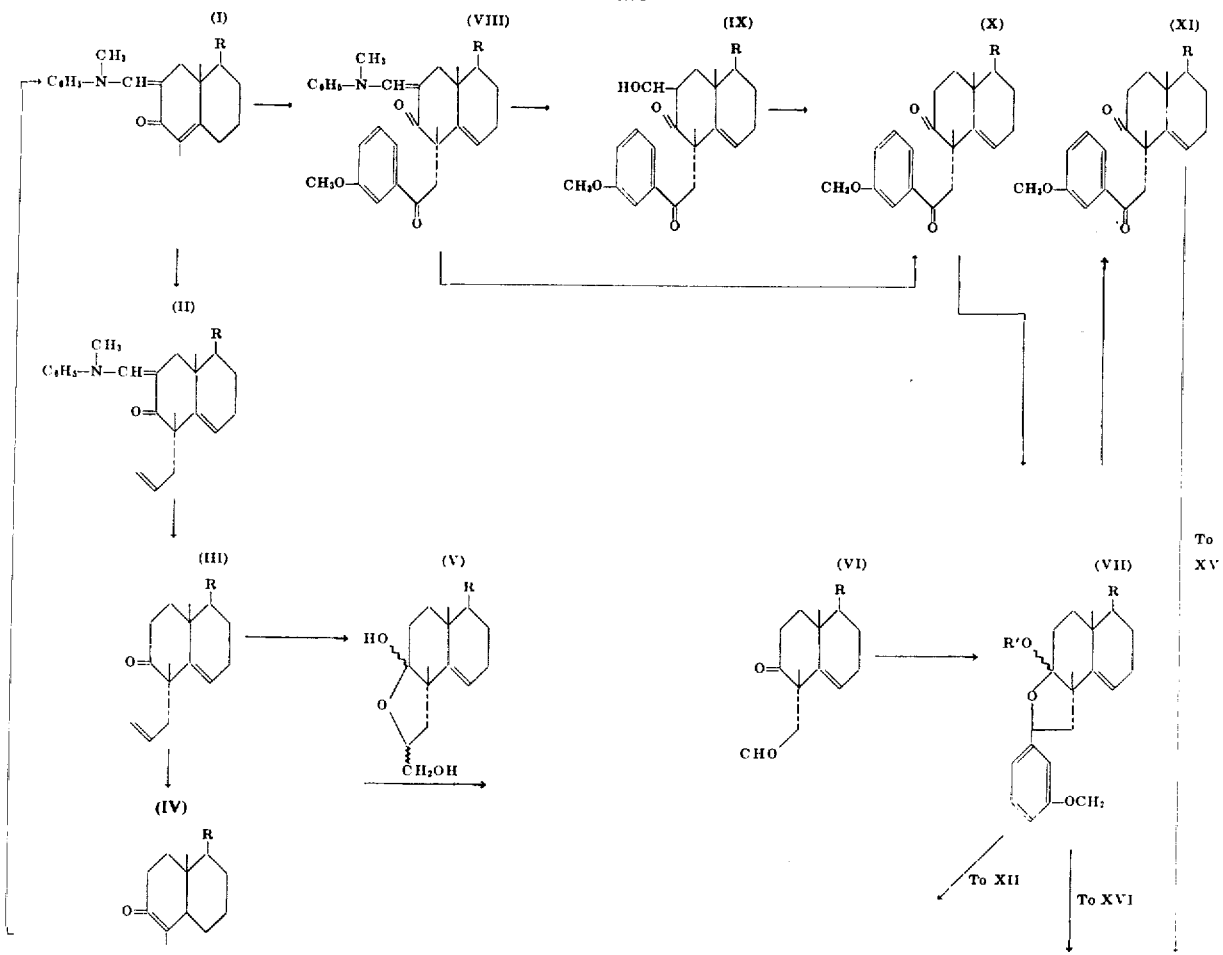

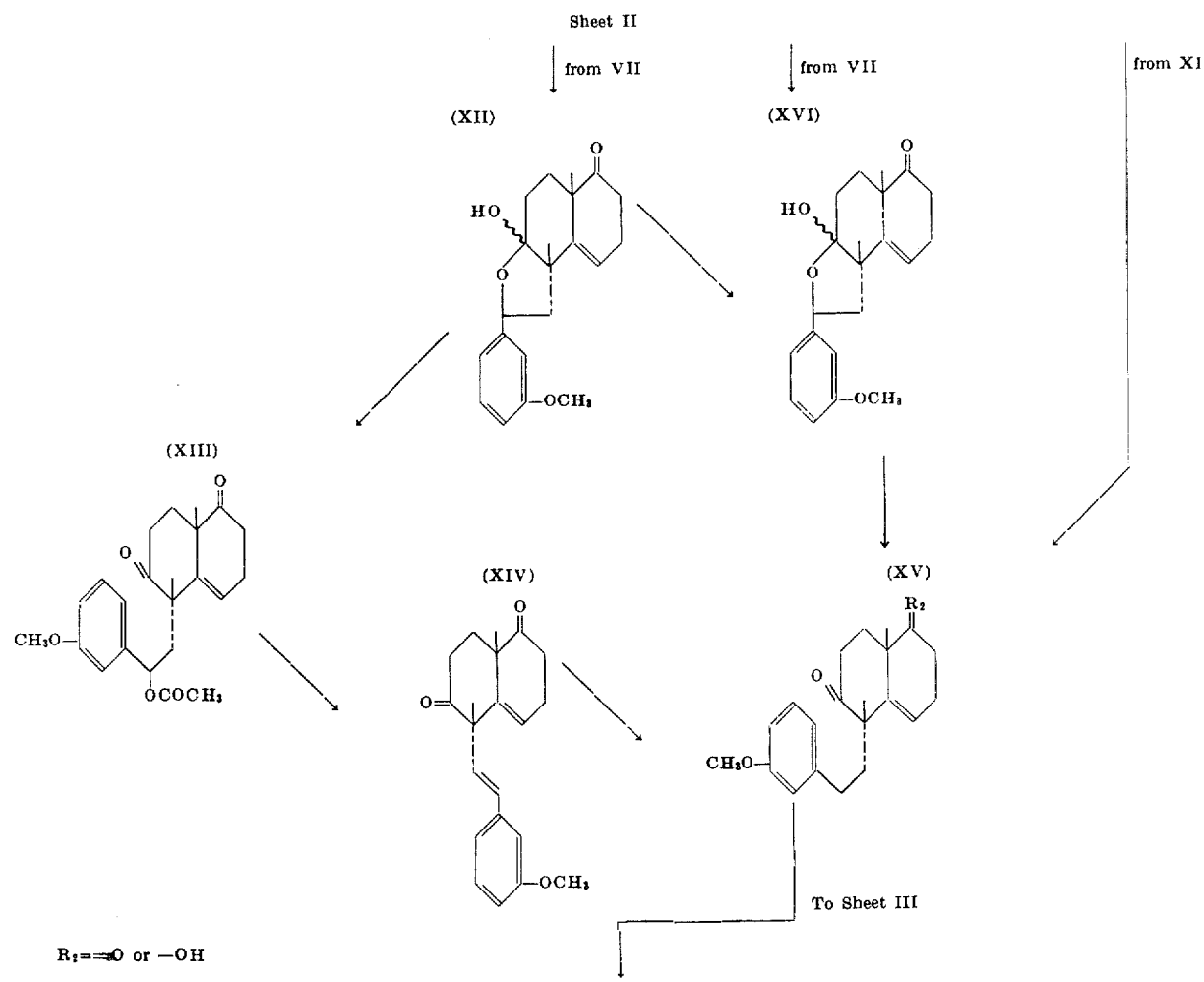

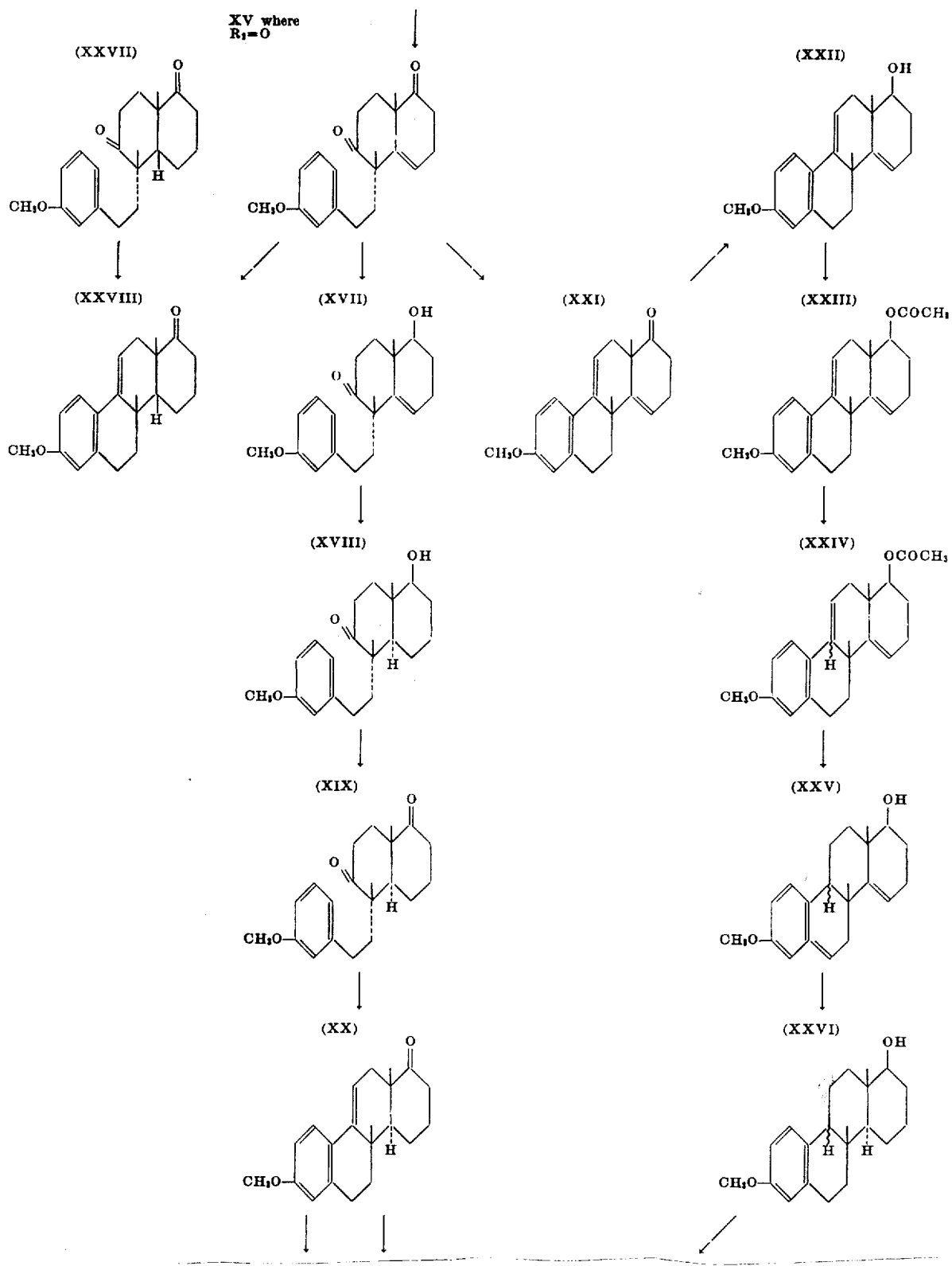

Sheet IV

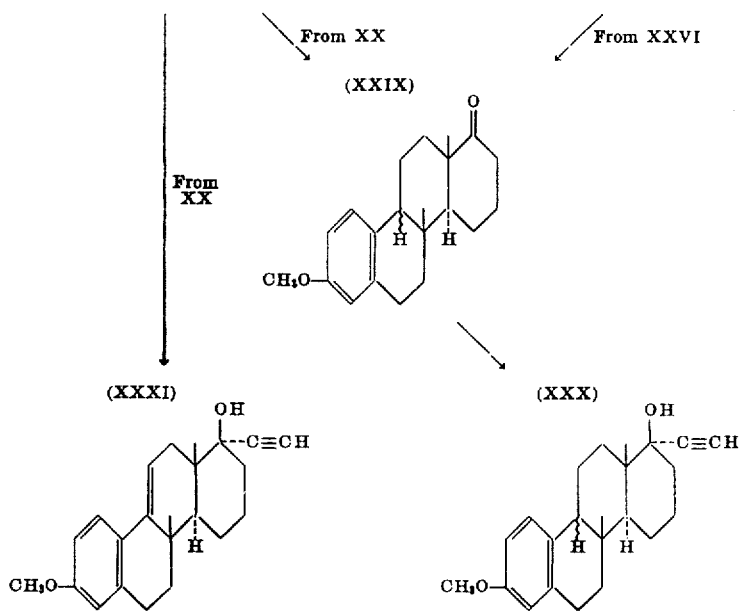

The novel compounds of this invention represented by formulas A, B, C, and E set forth in the above Summary, are useful as intermediates, in the synthesis of the estrogenic compounds of the formulas D, F, and G, depicted in said Summary.

As indicated compounds of the formulas:

(D) 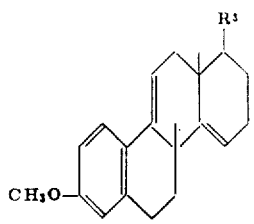

(G) 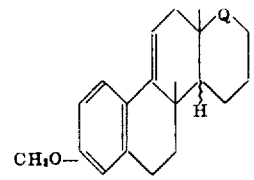

(F) 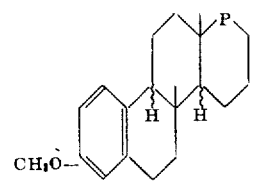

wherein $R_3$ is oxo, hydroxyl or acetoxy, P is

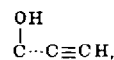

and

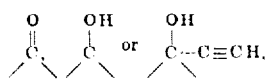

and Q is

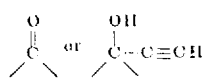

the $C_{14}$ hydrogen is either cis or trans to the $C_{13}$ methyl group. These compounds have substantial estrogenic activity in domestic and laboratory animals such as rats, guinea pigs, rabbits, sheep, swine and the like.

In the treatment of the smaller animals such as rabbits, guinea pigs and rats, generally about 0.225 to 10 mg. and preferably 0.50 to 10 mg./head/day of a compound of the above formula is effective in obtaining an estrogenic response in said animals.

These estrogenically active compounds may be administered by injection as a liquid formula described in Example 42 hereinafter, or they may be administered as solids admixed with the feed or in the form of tablets, pills, capsules, powders or as liquids, emulsions, solutions or suspensions using a conventional pharmaceutically acceptable carrier.

DETAILED DESCRIPTION

The following examples describe in detail the preparation of representative compounds within the scope of the present invention and illustrated structurally on the synthesis diagram.

EXAMPLE 1

Preparation of 4,4a,5,6,7,8-Hexahydro-5β-hydroxy-1,4aβ-dimethyl-2(3H)naphthalenone (IV-R=hydroxyl)

A solution containing 58.4 g. (0.304 mole) endione in 500 ml. absolute ethanol is cooled to 0° with stirring. Then 1.3 sodium borohydride is added to the solution and at 15 minute intervals, two more portions of 1.3 g. sodium borohydride is added. Fifteen minutes after the final addition, the solution is acidified with acetic acid and then the solvents evaporated. The residue is dissolved in chloroform, the organic phase washed with water, saturated sodium bicarbonate solution, dried and evaporated. The residue is distilled and recrystallized from ether-hexane and has melting point 70°–80° C. Calcd. for $C_{12}H_{18}O_2$: C, 74.19; H, 9.34  Found: C, 74.17; H, 9.24.

EXAMPLE 2

Preparation of 5β-tert-Butoxy-4,4a,5,6,7,8-hexahydro-1,4aβ-dimethyl-2(3H)naphthalenone (IV-R=tertiarybutoxy)

To a solution containing 4.0 g. (0.0206 mole) of the alcohol of Example 1 in 20 ml. dry methylene chloride at −20° C. in a pressure bottle is added approximately 20 ml. liquid isobutylene. Then 0.5 ml. catalyst (100 percent phosphoric acid saturated with boron trifluoride) is added, the pressure bottle closed and the mixture shaken at room temperature overnight. The bottle is cooled to −20° C. opened and a stream of dry nitrogen passed through the solution to remove excess isobutylene. The residue is disluted with methylene chloride and washed thoroughly with a saturated sodium bicarbonate solution. The aqueous phase is re-extracted with methylene chloride and the combined organic phase dried and evaporated. The products from a total of four such experiments were combined to give 24.1 g. oil. This is dissolved in hexane and passed through a short column of neutral alumina. After evaporation of the solvent, the residue weighs 20.85 g. The t-butyl ether has boiling point 120°–122° C. at 0.3 mm., $ND^{25}$ 1.5073.

EXAMPLE 3

Preparation of 4,4a,5,6,7,8-Hexahydro-1,4aβ-dimethyl-5β-[(tetra-hydropyran-2-yl)-oxy]-2(3H)-naphthalenone (IV-R=tetrahydropyranyloxy)

To a solution containing 1.94 g. (0.01 mole) of the alcohol (prepeared in Example 1) in 10 ml. dry tetrahydrofuran is added 2.5 ml. of pure dihydropyran followed by 2 drops of phosphorus oxychloride. After standing at room temperature for 4 hours, the solution is poured into saturated sodium bicarbonate solution, extracted with ether and the ether extract dried and evaporated. The residue consists of essentially pure tetrahydropyranyl ether. The infrared spectrum shows no residual hydroxyl group. Other strong acid catalysts such as hydrochloric, sulfuric and p-toluenesulfonic acid may replace the phosphorus oxychloride.

EXAMPLE 4

Preparation of 3′,4′,8′,8′a-Tetrahydro-5′,8′a-dimethyl-spiro-[1,3-dioxolane-2,1′(2H)-naphthalen]-6′(7′H)-one (IV-R=ethylene-dioxy)

To a mixture of 6 g. (3.13 mmoles) enedione, (IV, R= 0, 10 ml. ethylene glycol in 180 ml. benzene is added 100 mg. p-toluenesulfonic acid. The solution is heated at reflux under a water separator for 2¼ hours. The cold solution is diluted with ether and washed with sodium bicarbonate solution, water and saturated brine. The residue is filtered through a plug of alumina in benzene and the solvent evaporated. Crystallization of the residue from hexane at 0° gives 4.6 g. ketal (62.5 percent), melting point 53°–55° C.

EXAMPLE 5

Preparation of 3′,4′,8′,8′a-Tetrahydro-7′-(hydroxymethylene)-5′,8′a-dimethyl-spiro[1,3-dioxolane-2,1′(2′H-naphthalen]-6′-(7′H)-one In a 5 liter three-necked flask equipped with stirrer, dropping funnel and nitrogen inlet, there is placed 100 g. (1.85 moles) sodium methoxide, 1,700 ml. benzene and through the dropping funnel, 265 ml. ethyl formate. After cooling in an ice-water bath, 127.4 g. (0.539 mole) ketal (prepared in Example 4) in 640 ml. benzene is added at 0° and stirred overnight at room temperature. The mixture is cooled to 0° and 500 ml. of 2.5M sodium dihydrogen phosphate solution added. A further 500 ml. phosphate solution, 500 ml. water and 500 ml. benzene is added and the aqueous phase separated. The organic phase is washed with water, dried and evaporated. The residue weighs 143 g. and has the above structure.

EXAMPLE 6

Preparation of 5β-tert-Butoxy-4,4a,5,6,7,8-hexahydro-3-(hydroxymethoxymethylene)-1,4aβ-dimethyl-2(3H)-naphthalenone In a flask equipped with stirrer, thermometer and dropping funnel with nitrogen inlet is placed 111 g. (2.06 mole) of sodium methoxide and 1,900 ml. dry benzene. A nitrogen atmosphere is maintained throughout the reaction. Through the dropping funnel is then added 300 ml. ethyl formate in a stream. The mixture is cooled to 12° C. and 150.5 g. (0.6 mole) of crude t-butyl ether (prepared in Example 2) in 700 ml. dry benzene is added dropwise and the mixture stirred overnight. The organic phase is then extracted with water and 2N sodium hydroxide. The aqueous phases are acidified with 2.5M sodium dihydrogen phosphate and extracted with ether. The ether extract is washed with water, dried and evaporated to give 164.2 g. of oil. The formyl compound is crystallized from n-propanol and has melting point 76°–77° C. Calcd. for $C_{17}H_{26}O$: C, 73.34; H, 9.41  Found: C, 73.26; H, 9.42.

EXAMPLE 7

Preparation of 5β-tert-Butoxy-4,4a,5,6,7,8-hexahydro-1,4aβ-dimethyl-3-(N-methylanilinomethylene)-2(3H)-naphthalenone (I-R=t-butoxy)

To a solution containing 2.78 g. (10 mmoles) of the formyl compound (prepared in Example 6) in 10 ml. methanol is added 1.17 g. (11 mmoles) N-methylaniline. The mixture is warmed slightly and then allowed to stand at room temperature overnight. The solvent and excess aniline are removed under reduced pressure to leave 3.5 g. of orange-yellow oil. This material is crystallized from nitromethane and has melting point 77.5°–79° C.

EXAMPLE 8

Preparation of 3′,4′,8′,8′a-Tetrahydro-5′,8′a-dimethyl-7′-(N-methylanilinomethylene)-spiro[1,3-dioxolane-2,1′(2′H)-naphthalen]-6′(7′H)-one The formyl compound (prepared in Example 5) is dissolved in 900 ml. methanol and 296 ml. (293.2 g., 2.74 moles) of N-methylaniline added. After standing at room temperature, the crystalline product separates and is removed by filtration and washed with hexane. The solvents are removed under reduced pressure and finally high vacuum to remove excess N-methylaniline. The residue is triturated with 100 ml. methanol and the crystalline product removed by filtration. The combined crystalline product weighs 165.35 g., melting point 152°–153° C.

EXAMPLE 9

Preparation of 5′α-allyl-3′,7′,8′,8′a-Tetrahydro-5′β,8′aβ-dimethyl-7′-(N-methylanilinomethylene)-spiro[1,3-dioxolane-2,1′(2′H)-naphthalen]-6(5′H)-one (II R=ethylenedioxy)

To a stirred solution of 3.53 g. (0.01 mole) of material (prepared in Example 8) in 125 ml. dry t-butanol under nitrogen is added 5.6 g. potassium t-butoxide. The solution is heated under reflux for 30 minutes. The mixture is cooled to room temperature and 6.05 g. (0.05 mole) redistilled allyl bromide added dropwise. The solution is then heated under reflux for 1 hour. After cooling, the solution is poured into water, acidified with 2.5M sodium dihydrogen phosphate and extracted with ether. The extract is washed with water, dried and the solvent removed under reduced pressure to give the crude product (4.35 g.). Crystallization from absolute ethanol gives 2.24 g. (57 percent) of desired product, melting point 147.5°–149.5° C. Calcd. for $C_{25}H_{31}O_3N$: C, 76.30; H, 7.94; N, 3.56  Found: C, 75.98; H, 7.81, N, 3.83.

EXAMPLE 10

Preparation of 5′α-Allyl-3′,7′,8′,8′a-Tetrahydro-5′β8′aβ-dimethyl-spiro[1,3-dioxolane-2,1′(2′H)-naphthalen]-6′(5′H)-one (III R=ethylenedioxy)

A mixture containing 30.65 g. (0.078 mole) aniline compound, (prepared in Example 9) in 160 ml. 2-ethoxyethanol and 160 ml. water containing 35.0 g. potassium hydroxide is heated at reflux under nitrogen for 4 hours. The mixture is cooled, diluted with water and extracted with ether. The organic phase is washed successively with water, dilute hydrochloric acid, water and brine, dried and evaporated. The residue is crystallized from hexane to give the product melting point 67.5°–68.5° C. Calcd. for $C_{17}H_{24}O_3$: C, 73.88; H, 8.75 Found: C, 73.73; H, 8.64.

EXAMPLE 11

Preparation of 5'α-allyl-3',7',8',8'a-Tetrahydro-5'β,8'aβ-dimethyl-spiro[1,3-dioxolane-2,1'(2'H)-naphthalen]-6'(5'H)-one
(III R=ethylenedioxy To a solution containing 47.0 g. enone (prepared in Example 4) in 500 ml. dry t-butanol is added under nitrogen with stirring 56 g. potassium t-butoxide. The mixture is heated under reflux for 2 hours. The solution is cooled to room temperature and 29 g. allyl bromide is added dropwise. After stirring a further one-half hour at room temperature, the mixture is poured into water and extracted twice with ether. The ether extract is washed twice with water, dried and evaporated. The residue is crystallized from hexane to give 30.9 g. allyl compound identical with that formed in Example 10.

When the starting material contains the t-butoxy or tetrahydropyranyloxy group instead of ethylenedioxy the corresponding t-butoxy and tetrahydropyranyloxy products are obtained.

EXAMPLE 12

Preparation of 2',3'a,4',5',5'a,7',8',9'b-Octahydro-3'a-hydroxy-5'aβ9'bβ-dimethyl-spiro[1,3-dioxolane-2,6'(1'H)-naphtho-[2,1-b]furan]-2'-methanol (V R=ethylenedioxy)

To a solution containing 27.6 g. of the allyl compound (prepared in Example 10), in 450 ml. tetrahydrofuran is added a solution containing 12.8 g. sodium chlorate in 200 ml. water and 2 ml. of an aqueous solution of osmium tetroxide (1 mmole/5 ml. water). After standing overnight at room temperature, this solution is combined with a similar one and shaken with a solution of 575 g. sodium sulfite in 2.5 liters of water. The mixture is extracted twice with methylene chloride and the extract washed with saturated brine. The organic phase is dried and concentrated. The residue is crystallized from ether to give 49.9 g. hemiketal, melting point 122°–136° C. as a mixture of stero isomers. A second crop of crystals weighed 4.4 g.

Similar reaction with ether the tetrahydropyranyl ether or t-butyl ether yield the corresponding hemiketal as oils.

EXAMPLE 13

Preparation of 5'α-Formylmethyl-3',7',8',8'a-tetrahydro-5'β,8'aβ-dimethyl-spiro[1,3-dioxolane-2,1'(2'H)-naphthalen]-6'-(5'H)-one (VI R=ethylenedioxy)

To a solution containing 49.9 g. of the hemiketal (prepared in Example 12), in 480 ml. tetrahydrofuran is added with stirring and cooling 74.1 g. sodium metaperiodate in 480 ml. water. Stirring is continued overnight at room temperature. The mixture is then shaken with a solution containing 230 g. sodium sulfite and extracted with methylene chloride. The extract is washed with saturated brine, dried and evaporated. The residue is crystallized from ether-hexane to give 38.2 g. of the above aldehyde, melting point 61°–62.5° C. identical with the aldehyde prepared by ozonolysis of (III).

EXAMPLE 14

Preparation of 5'α-Formylmethyl-3',7',8',8'a-tetrahydro-5'β,8'β-dimethylspiro[1,3,dioxolane-2,1'(2'H)-naphthalen]-6'(5'H)-one (VI R=ethylenedioxy)

In a gas wash bottle with fritted disc on the end of the inlet tube is placed 2.76 g. (0.01 mole) of allyl compound (prepared in Example 11) and 5.2 ml. pyridine and 36 ml. chloroform added. The solution is cooled to −20° C. and 1.3 equivalents of ozone passed into the solution. Excess ozone is then removed in a stream of nitrogen. Then a mixture of 5.48 ml. water, 5.45 ml. acetic acid and 10.76 ml. pyridine is added to the solution. While keeping the temperature of the solution below 0°, 3.28 g. zinc powder (which had been washed first with 2N acetic acid followed by water) is added in small portions with shaking and cooling during about 20 minutes. The mixture is filtered into a separatory funnel and diluted with benzene and water. The aqueous phase is reextracted with benzene. The combined organic phases are washed successively with water, saturated sodium bicarbonate, with 1.5 N phosphoric acid, saturated sodium bicarbonate and water. The benzene solution is dried and evaporated to leave the above aldehyde (2.0 g.),

EXAMPLE 15

Preparation of 2',3'a,4',5',5'a,7',8',9'b-Octahydro-2'-(m-methoxyphenyl)-5'aβ,9'bβ-dimethyl-spiro[1,3-dioxolane-2,6'-(1'H)naphtho]2,1-b[furan]-3'a-ol (VII R=ethylenedioxy and $R_1$=H)

All operations are carried out under dry nitrogen. To 1 g. of magnesium is added enough dry tetrahydrofuran to cover the metal. A few drops of dibromoethane is added to initiate the reaction. Then 5.61 g. (0.03 mole) m-bromoanisole is added at such a rate as to maintain a reaction mixture temperature of about 50°. The mixture was then stirred at 50° for a further 0.5 hour. The Grignard reagent is transferred to a dropping funnel using dry tetrahydrofuran to complete the transfer. Half of this solution is then added dropwise to the crude aldehyde (prepared in Example 14) in 40 ml. dry tetrahydrofuran. After the addition, the reaction mixture is stirred at room temperature for 1 hour. The excess reagent is destroyed by the addition of 40 ml. of a 2.5 M sodium dihydrogen phosphate and after stirring for 10 minutes, the mixture is diluted with ether and water. The ether extract is washed twice with water followed by saturated brine, dried and evaporated. The residue is crystallized from ether to give in three crops 1.2 g. of the above hemiketal, melting point 148°–155° C.

EXAMPLE 16

Preparation of 3',7',8',8'a-Tetrahydro-5'α-(m-methoxyphenacyl)-5'β,8'aβ-dimethyl-7'-(N-methylanilinomethylene)-spiro[1,3-dioxolane-2,1'(2'H)-naphthalen]-6'(5'H)-one
(VIII R=ethylenedioxy)

In a flask equipped with stirrer, condensor (with dry nitrogen inlet) and dropping funnel are placed 52.95 g. (0.15 mole) of 3',4',8',8'a-Tetrahydro-5',8'a-dimethyl-7'-(N-methylanilinomethylene)-spiro[1,3-dioxolane-2,1'(2'H)naphthen]6'(7'H)-one (prepared in Example 8) in 600 ml. dry dimethoxyethane and 16.65 g. sodium hydride (54 percent suspension in mineral oil). The mixture is heated with stirring under reflux in a nitrogen atmosphere for 2 hours. This mixture is cooled and a solution of 51.45 g. (0.225 mole) of m-methoxyphenacyl bromide in about 500 ml. dry dimethoxyethane is added very slowly at room temperature. After the addition, the solution is stirred overnight at room temperature. Water is added to the solution and the reaction mixture poured into water, acidified with 2.5 M sodium dihydrogen phosphate and extracted with methylene chloride. The extract is washed with water, dried and evaporated. The residue is crystallized from acetone to give 45.3 g. (60%) of desired product, melting point 169.5°–170.5° C. Calcd. for $C_{31}H_{35}O_5$ N: C, 74.23; H, 7.03; N, 2.79  Found: C, 74.39; H, 7.20; N, 2.36.

A similar experiment is run using the same quantities as above. The only modification made is that the phenacyl bromide is added to the reaction mixture at ice-bath temperature during 4.2 hours. The yield of product is 63.9 g. or 84.7 percent

EXAMPLES 17 and 18

Preparation of 3',7',8',8'a-Tetrahydro-5'α-(m-methoxyphenacyl)-5'β,8'aβ-dimethyl-spiro[1,3-dioxolane-2,1'(2'H)-naphthalen]-6'-(5'H)-one (X R=ethylenedioxy), and 3',7',8',8'a-Tetrahydro-7'-(hydroxymethylene)-5'α-(m-methoxyphenacyl)-5'β,8'aβ-dimethyl, spiro[1,3-dioxolane-2,1'(2'H)naphthalen]-6'(5'H)-one (IX R=ethylenedioxy)

To a solution of 91.8 g. (0.183 mole) of the anilino compound (prepared in Example 16) in 610 ml. 2-ethoxyethanol is added 610 ml. water containing 258 g. potassium hydroxide. The mixture is heated at reflux under nitrogen for 6 hours and then cooled overnight. Two liters of water are added and the solution extracted with ether. The ether extract is successively washed with water, cold 2 N hydrochloric acid and water. The extract is dried and the solvent evaporated. The residue (X, R=ethyleneidoxy) on trituration with ether and recrystallization from acetone-hexane has melting point 121°–122° C. Calcd. for $C_{23}H_{28}O_5$: C, 71.85; H, 7.34 Found: C, 71.59; H, 7.34.

The aqueous phase from the first ether extraction above is acidified with ice-cold 2N hydrochloric acid and extracted with methylene chloride. The extract is washed with water and brine, dried and evaporated. The residue on trituration with ether at −5° C. and recrystallization from methanol gave the formyl compound, melting point 157°–160.5° C. (IX, R=ethylenedioxy). Calcd. for $C_{24}H_{28}O_6$: C, 69.88; H, 6.84 Found: C, 69.57; H, 6.89.

EXAMPLE 19

Preparation of 3',7',8',8'a-Tetrahydro-5'α-(m-methoxyphenethyl)-5'β,8'aβ-dimethyl-spiro[1,3-dioxolane-2,1'(2'H)-naphthalen]-6'(5'H)-one (XI, R=ethylenedioxy)

A. A solution containing 10.0 g. (0.026 mole) of the diketone (X, R = ethylenedioxy) (Example 17) in 150 ml. glacial acetic acid is reduced with hydrogen at 70° C. in the presence of 1 g. 5 percent palladium on carbon. The initial pressure is 51.8 p.s.i. Reduction is complete in 3 hours. The solution is cooled, the catalyst removed by filtration and the solvent removed under reduced pressure. The residue (i.e., crude product [XI, R = ethylenedioxy]) is used directly for the preparation of the naphthalenedione (XV, R =ethylenedioxy).
R₂=O B. A solution containing 4.5 g. of hemiketal (prepared in Example 15) in 50 ml. glacial acetic acid is reduced with hydrogen at 70° and 50 p.s.i. in the presence of 200 mg. 5 percent palladium on carbon. Reduction is complete in 3 hours. The catalyst is removed and the solvent evaporated to leave crude ketone (XI, R = ethylenedioxy) of sufficient purity for further transformations.

C. Similarly, reduction of the corresponding t-butoxy or tetrahydropyranyloxy ethers (VII) yields the corresponding ketones (XI, R=t-butoxy and tetrahydropyranyloxy).

EXAMPLE 20

Preparation of 2',3'a,4',5',5'a,7',8',9'b-Octahydro-2'-(m-methoxyphenyl)-5'aβ,9'bβ-dimethyl-spiro[1,3-dioxolane-2,6'-(1'H)-naphtho[2,1-b]furan]-3'a-ol (VII, R'=H) 2',3'a,4',5',5'a, 7,8',9'b-Octahydro-3'aζ-methoxy-2'-(m-methoxyphenyl)-5'aβ,9'bβ-dimethyl-spiro[1,3-dioxolane-2,6'(1'H)-naphthol[2,1-b]furan]

(VII, R'=CH₃) 1,2,3a,4,5,5a,8,9b-Octahydro-3aζ-hydroxy-2-(m-methoxyphenyl)-5aβ,9bβ-dimethyl-naphtho[2,1-b]furan-6(7H)-one (XII)

A solution containing 10 g. of the diketone (prepared in Example 17) (X, R = ethylenedioxy) in 180 ml. methanol is reduced catalytically at 60° C. and an initial pressure of 50 p.s.i. in the presence of 1.0 g. 5 percent palladium on carbon. The reduction is complete in 2 hours. The mixture is cooled, and filtered and the solvent removed under reduced pressure. The residue is a mixture of hemiketal (VII, R'= H) and the mixed ketal (VII, R' =CH₃).

The crude reduction product is dissolved in a mixture of 108 ml. acetic acid and 36 ml. water and the solution heated on the steam bath for 1 hour. The reaction mixture is poured into water and extracted with ether. The extract is washed with water and saturated sodium bicarbonate solution. The ether is dried, the solvent evaporated and the residue crystallized from acetone-hexane to give product (XII), melting point 135.5°–138.5°. Calcd. for $C_{21}H_{26}O_4$: C, 73.66, H, 7.66. Found: C, 73.60; H, 7.59.

By concentration of the mother liquors the second crystalline isomer, is obtained. Recrystallization of this material from acetone-hexane gives product, melting point 132.5°–133.5° C.

EXAMPLE 21

Preparation of 3,7,8,8a-Tetrahydro-5α-(β-hydroxy-m-methoxyphenethyl)-5β,8aβ-dimethyl-, 1,6(2H,5H)-naphthalenedione, acetate (XIII)

A solution containing 5.0 g. (0.0146 mole) of the hemiketal (XII) (prepared in Example 20) in 80 ml. acetic acid and 40 ml. acetic anhydride is heated under reflux for 1 hour. The solvents are then removed under reduced pressure, the residue dissolved in toluene and this also removed under reduced pressure. The residue compound (XIII) is used without further purification.

EXAMPLE 22

Preparation of 3,7,8,8a-Tetrahydro-5α-(m-methoxystyryl)-5β,8aβ-dimethyl-1,6(2H,5H)-naphthalenedione (XIV)

A solution containing 2.0 g. p-toluenesulfonic acid in 170 ml. benzene is heated under reflux under a Dean-Stark water separator filled with anhydrous calcium sulfate for 20 minutes. The crude acetate prepared in Example 21 in 40 ml. benzene is then added and refluxing continued for 1 hour. The solution is cooled, diluted with ether and washed with saturated sodium bicarbonate. The organic phase is dried and evaporated. The residue is crystallized from methanol to give 1.8 g. product (XIV). Recrystallization of this material from methanol gives 1.5 g., melting point 91°–92° C. Calcd. for $C_{21}H_{24}O$: C, 77.75; H, 7.46. Found: C, 77.57; H, 7.51.

EXAMPLE 23

Preparation of 3,7,8,8a-Tetrahydro-5α-(m-methoxyphenyl)-5β,8aβ-dimethyl-1,6(2H,5H)-naphthalenedione (XV, R₂==0)

The crude product (XI) prepared in Example 19 above is heated on the steam-bath with 20 ml. water and enough acetic acid to give a homogeneous solution for 1 hour, After standing at room temperature overnight, the solution is diluted with water and extracted with ether. The ether extract is washed with water and then saturated sodium bicarbonate solution. The extract is dried and the solvent removed. The residue crystallized from methanol to give 5.0 g. product (XV, R₂ = 0), melting point 68°–70° C.

EXAMPLE 24

Preparation of 3,7,8,8a-Tetrahydro-5α-(m-methoxyphenyl)-5β,8aβ-dimethyl-1,6(2H,5H)-naphthalenedione (XV, R₂==0)

A solution containing 324 mg. (1 mmole) of compound (XIV) (prepared in Example 22) in 15 ml. ethanol is reduced catalytically at room temperature and atmospheric pressure in the presence of 50 mg. 5 percent palladium on carbon. The catalyst is removed by filtration and the solvent removed under reduced pressure. After standing for sometime, the product crystallizes. Crystallization from a mixture of ether and hexane gives product, (XV, $R_2 = 0$), melting point 60°–71°C. Calcd. for $C_{21}H_{28}O_3$; C, 77.27; H, 8.03   Found: C, 77.39; H, 7.93.

EXAMPLE 25

Preparation of 1,2,3a,4,5,5a,6,7,8,9b-Decahydro-2-(m-methoxyphenyl)-5aβ,9bβ-dimethyl, naphthol[2,1-b[furan-3aζ,6β-diol (XIV)

To a solution containing 5.0 g. (0.015 mole) ketone (XII) (prepared in Example 20) in 100 ml. absolute ethanol is added 2.0 g. sodium borohydride. The reaction is allowed to proceed at room temperature with intermittent swirling for 15 minutes. The mixture is then poured into water and extracted with ether. The ether extract is washed with water, saturated brine, dried and evaporated. The residue is crystallized from acetone-hexane to give product compound (XVI), melting point 141°–148° C. Calcd. for $C_{21}H_{28}O_4$: C, 73.22; H, 8.19. Found: C, 73.05; H, 8.13.

EXAMPLE 26

Preparation of 3,4,4a,5,6,7-Hexahydro-5β-hydroxy-1α-(m-methoxyphenyl)-1β,4aβ-dimethyl-2(1H)-napthalenone (XVII)

A solution containing 688 mgs. of the hemiketal (prepared in Example 25) in 18 ml. glacial acetic acid is reduced with hydrogen at 45 p.s.i. and 70° in the presence of 100 mgs. 5 percent palladium on carbon. The reduction is complete in 2 hours when the mixture is cooled, the catalyst removed and the solvent evaporated under reduced pressure. The material (XV, $R_2$ = OH or XVII) is of sufficient purity for conversion by oxidation to compound (XV, $R_2 = 0$) or reduction to compound (XVIII).

EXAMPLE 27

Preparation 3,4,4a,5,6,7-Hexahydro-5β-hydroxy-1α-(m-methoxyphenethyl)-1β,4aβ-dimethyl-2(1H)-naphthalenone (XVII)

A. To a solution containing 1.63 g. of the enedione (prepared in Example 23) in 25 ml. 95 percent ethanol is added with stirring 0.5 g. sodium borohydride. Stirring is continued for 15 minutes and the mixture then diluted with a large volume of water. The solution is extracted with ether, the extract washed with water, dried and evaporated. The residue compound (XVII), an oil, is used without further purification.

B. A solution containing 688 mgs. of the hemiketal (prepared in Example 25) in 18 ml. acetic acid is hydrogenated at 70° C. and 50 p.s.i. After 3 hours the catalyst is removed and the solvent evaporated to give a residue identical to that described above compound (XVII).

EXAMPLE 28

Preparation of 3,4,4a,5,6,7,8,8aα-Octahydro-5β-hydroxy-1α(m-methoxyphenethyl)-1β,4aβ-dimethyl-2(1H)-naphthalenone (XVIII)

A solution containing 1.38 g. of crude unsaturated keto alcohol (XVII) prepared as in Example 27 in 20 ml. ethanol is reduced at 70° C. with hydrogen in the presence of 200 mg. 5 percent palladium on carbon. After 20 hours, the catalyst is removed and the solvent evaporated. The residue containing the above named product (XVIII) is used without further purification.

EXAMPLE 29

Preparation of 3,4,4aα,7,8,8a-Hexahydro-5α-(m-methoxyphenethyl)-5β,8aβ-dimethyl-1,6(2H,5H)-naphthalenedione (XIX)

The crude keto alcohol (XVIII) prepared in Example 28 is dissolved in 20 ml. acetone and cooled to 0°. Jones' reagent is then added dropwise with stirring until a permanent brown color is obtained. The solution is stirred for 15 minutes at room temperature and then poured into water and extracted with ether. The extract is washed with water, dried and evaporated. The residue is crystallized from ether-hexane to give 640 mg. trans-dione, (XIX), melting point 86°–88.5° C.

EXAMPLE 30

Preparation of 3-Methoxy-8β-methyl-D-homoestra-1,3,5(10), -9(11), tetraen-17a-one (XX)

To 328 mgs. of the trans-dione (XIX) (prepared in Example 29) in 6 ml. ethanol is added 3 ml. concentrated hydrochloric acid and the solution refluxed for 20 minutes. The mixture is diluted with water and extracted with water, dried and evaporated. The residue is crystallized from acetonitrite to give the product (XX), melting point 150.5°–152.5° C.

EXAMPLE 31

Preparation of 3-Methoxy-8β-methyl,D-homoestra-1,3,5(10), 9(11)-14-pentaen-17a-one (XXI)

A. To 1 g. of the diketone (XV, $R_2 = 0$) (prepared in Example 23) in 18 ml. ethanol is added 6 ml. concentrated hydrochloric acid and the mixture heated under reflux for 20 minutes. The solution is cooled, poured into water and extracted with ether. The ether is washed with water, dried and evaporated. The residue, (XXI) is used directly for the preparation of the following compound (XXII).

B. Approximately 2 ml. of liquid hydrogen fluoride are placed in a polyethylene tube containing a magnetic stirrer and immersed in an ice-water bath. To this is added 1 g. diketone (XV) (prepared in Example 23) and the mixture stirred for 5 minutes. Methylene chloride is then added and the solution washed twice with water followed by saturated sodium bicarbonate solution. The organic phase is dried and the solvent removed under reduced pressure. The residue XXI is used directly for the preparation of compound (XXII).

EXAMPLE 32

Preparation of 3-Methoxy-8β-methyl,D-homoestra-1,3,5(10), 9(11), 14-pentaen-17aβ-ol (XXII)

A. The crude product (XXI) (prepared in Example 31) above using concentrated hydrochloric acid to effect the cyclization is dissolved in 10 ml. ethanol and 500 mgs. sodium borohydride added. The solution is allowed to stand at room temperature with intermittent swirling for 7 hours. The mixture is diluted with water, acidified with concentrated hydrochloric acid and extracted with ether. The ether extract is washed twice with water followed by saturated sodium bicarbonate solution, dried and the solvent evaporated. The residue compound (XXII) is used directly for the preparation of the acetate compound (XXIII). The product (XXII) has, melting point 96°–97° C. Calcd. for $C_{21}H_{28}O_2$: C, 81.27; H, 8.44.   Found: C, 81.30 H, 8.54.

EXAMPLE 33

Preparation of 3-Methoxy-8β-methyl-,D-homoestra-1,3,5(10),bh9(11), 14-pentaen-17aβ-ol acetate (XXIII)

A. The crude product (XXII) (prepared in Example 32) above is allowed to stand overnight with 10 ml. acetic anhydride and 2 ml. pyridine. The solvents are then removed under reduced pressure and the residue dissolved in ether. The ether extract is washed with dilute hydrochloric acid, water and saturated sodium bicarbonate, dried and the solvent evaporated. The residue is filtered through alumina in benzene. The benzene is evaporated and the residue crystallized from pentaene then hexane to give the acetate, compound (XXIII), melting point 133.5°–134° C. Calcd. for $C_{23}H_{28}O_3$: C, 78.37; H, 8.01. Found: C, 78.59; H, 8.12.

EXAMPLE 34

Preparation of 3-Methoxy-8β-methyl-,D-homo-9ζ-estra-1,3,5(10),14 tetraen-17aβ-ol, acetate (XXIV)

A solution containing 352 mgs. (1 mmole) of diene (XXIII) (prepared in Example 33) in 20 ml. glacial acetic acid is catalytically reduced at room temperature and atmospheric pressure in the presence of 100 mgs. 5 percent palladium on carbon. The catalyst is removed by filtration and the solvent evaporated. The residue in benzene is filtered through a plug of activated magnesium silicate and the solvent then removed under reduced pressure. The residue is crystallized from acetone-hexane to give product (XXIV), melting point 149°–155° C. Calcd. for $C_{23}H_{30}O_3$: C, 77.93; H, 8.53. Found: C, 77.69; H, 8.53.

EXAMPLE 35

Preparation of 3-Methoxy-8α-methyl-D-homo-9 ζ -estra-1,3,5(10),14-tetraen-17aβ-ol (XXV)

To 6.0 g. of the acetate (XXIV) (prepared in Example 34) dissolved in 150 ml. ethanol is added 50 ml. 2N potassium hydroxide solution and the mixture refluxed for 2 hours. The solution is diluted with water, acidified with 2N hydrochloric acid, and extracted with ether. The extract is washed with water and sodium bicarbonate solution, dried and evaporated. The residue is crystallized from acetone-hexane to give 3.6 g. of the alcohol, (XXV), melting point 135°–136° C.

EXAMPLE 36

Preparation of 3-Methoxy-8β-methyl-D-homo-9 ζ -estra-1,3,5(10)-trien-17aβ-ol (XXVI)

A solution containing 312 mg. of the unsaturated alcohol (XXV) (prepared in Example 35) in 18 ml. ethanol is reduced with hydrogen at 70° C. and 50 p.s.i. in the presence of 100 mg. 5 percent palladium on carbon. After 20 hours, the catalyst is removed and the solvent evaporated. The residue is dissolved in benzene and filtered through a plug of activated magnesium silicate. The solvent is removed and the residue crystallized from acetone-hexane to give 225 mg. product (XXVI), melting point 128°–131° C. The material is recrystallized from acetonitrile to yield a solvate, melting point 130°–132° C.

EXAMPLE 37

Preparation of 3,4,4,aβ,7,8,8a-Hexahydro-5α(m-methoxyphenyethyl)-5β,8aβ-dimethyl-1,6(2H,5H)-naphthalenedione (XXVII)

A solution containing 652 mgs. of the enedione (XV, $R_2$ = O) (prepared in Example 24) in 18 ml. absolute ethanol is reduced with hydrogen at 75° C. and 50 p.s.i. in the presence of 100 mg. 5 percent palladium on carbon. After shaking for 22 hours, the mixture is cooled and the catalyst removed by filtration. Fractional crystallization gives the cis isomer, cubes, melting point 74°–75° C. compound (XXVII) as the major product. The trans isomer, needles, melting point 87°–88° C. is also indicated in small quantity.

EXAMPLE 38

Preparation of 3-Methoxy-8β-methyl-D-homo-14β-estra-1,3,4(10),9(11)-tetraen-17a-one (XXVIII)

To 5 ml. anhydrous hydrogen fluoride in a polyethylene tube cooled to 0° with stirring is added 200 mgs. of the cis-dione compound (XXVII) (prepared in Example 37). After stirring for 5 minutes, the solution is diluted with methylene chloride and poured into ice-water. The organic phase is washed with aqueous bicarbonate solution, dried and evaporated. The residue is crystallized from acetone-hexane to give 123 mgs. compound (XXVIII). Recrystallization from acetonitrile gives sample melting point 139°–140° C.

Alternatively the cyclization can be carried out with strong acid. To a solution containing 200 mg. dione (XXVII) (prepared in Example 37) in 3 ml. ethanol is added 1 ml. concentrated hydrochloric acid and the solution refluxed for 20 minutes. The cold solution is diluted with water and extracted with ether, the extract washed twice with water, dried and evaporated. The residue is crystallized from acetone-hexane to give 175 mg. product (XXVIII) identical with that described in the paragraph above.

EXAMPLE 39

Preparation of 3-Methoxy-8β-methyl-D-homo-9 ζ -estra-1,3,5(10)-trien-17a-one (XXIX)

A. To a stirred solution containing 314 mg. of the alcohol compound (XXVI) (prepared in Example 36) in 25 ml. acetone at 0° is added dropwise Jones' reagent until a permanent brown-colored solution is obtained. The solution is stirred at room temperature for 15 minutes and then poured into water and extracted with ether. The extract is washed with water, dried and evaporated. The residue is crystallized from acetone-hexane to give 265 mgs. ketone (XXIX), melting point 148°–150° C.

B. A solution containing 310 mg. 3-methoxy-8β-methyl-D-homoestra-1,3,5(10),9(11)-tetraen-17a-one Compound (XX) (prepared in Example 30) in 15 ml. acetic acid is reduced with hydrogen at room temperature and atmospheric pressure in the presence of 100 mg. 5 percent palladium on carbon. After 1 hour, the catalyst is removed and the solvent evaporated. The residue is crystallized from acetone-hexane to give 248 mg. product, melting point 149°–150° C., identical with that described in paragraph A.

EXAMPLE 40

Preparation of 17aα-Ethynyl-3-methoxy-8β-methyl-D-homo-9 ζ -estra-1,3,5(10)-trien-17aβ-ol (XXX)

A stirred suspension of sodium hydride (800 mg., 54 percent) in 90 ml. dry dimethyl formamide is cooled to −10° C. and dry acetylene bubbled through the solution for 1 hour. A solution containing 1.248 g. of the ketone compound (XXIX) (prepared in Example 39) in 40 ml. dry dimethyl formamide is added dropwise and the admission of acetylene continued for 4 hours. Water is then cautiously added and the solution then diluted with water, acidified with 6N sulfuric acid and extracted with ether. The extract is washed with water, dried and evaporated. The residue is crystallized from acetonitrile. One recrystallization from acetonitrile gives the product compound (XXX) melting point 121°–127° C. The analytical sample has melting point 127°–128° C.

EXAMPLE 41

Preparation of 17aα-Ethynyl-3-methoxy-8β-methyl-D-homoestra-1,3,5(10),9(11)-tetraen-17aβ-ol (XXXI)

Dry acetylene is bubbled into a stirred suspension of sodium hydride (200 mg., 54 percent) in 30 ml. dry dimethyl formamide at −10° C. for 1 hour. Then 310 mgs. ketone compound (XX) (prepared in Example 30) in 15 ml. dry dimethyl formamide is added dropwise. Stirring and addition of acetylene at −10° C. is continued for 3 hours. Water is carefully added and when diluted acidified with 6 N sulfuric acid and extracted with ether. The ether is washed twice with water, dried and evaporated. The residue is crystallized from acetone-hexane. The product compound (XXXI) crystallizes as an acetone solvate, melting point 156.5°–158° C.

EXAMPLE 42

Test for estrogenic activity

Immature female Wistar origin rats are 19 to 21 days of age and are employed as the test animal to determine estrogenic activity of candidate compounds. Test compounds are given by subcutaneous injections once daily for three successive days in 0.2 ml. of injection vehicle. This invention vehicle is:
- 0.5 gm. carboxymethylcellulose (low viscosity)
- 0.4 gm. Tween 80
- 0.9 gm. sodium chloride
- 10.0 ml. polyethylene glycol (Carbowax 300)
- 90.0 ml. distilled water Twenty-four hours after the third injection the rats are sacrificed, the uteri removed and disected free from the ovaries, oviducts and mesentery. Each uterine horn is split longitudinally and the uterine fluid bottled dry. The uteri are weighed to the nearest milligram on a balance. Ten rats are used for each treatment. Increased uterine weight over the control (untreated) uteri indicates estrogenic activity. All animals receive a commercial laboratory animal ration ad libitum and fresh water is available at all times while on test. The following table summarizes the estrogenic activity of the present compounds.

TABLE

| Compound | Effective dose |
|---|---|
| 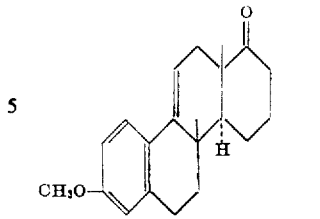 | 0.5 mg. estrogen/rat/day. |
| 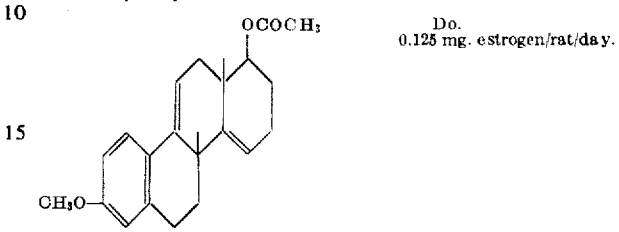 | Do. |
| | Do. |
| | Do. 0.125 mg. estrogen/rat/day. |

I claim:
1. A compound of the formula:

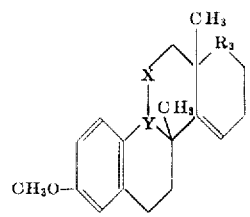

wherein $R_3$ is a member selected from the group consisting of

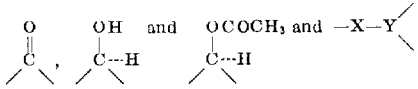

is a member selected from the group consisting of

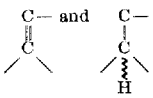

2. The compound in accordance with claim 1, 3-methoxy-8β-methyl, D-homoestra-1,3,5(10),9(11)-14-pentaen-17a-one.

3. The compound in accordance with claim 1, 3-methoxy-8β-methyl, D-homoestra-1,3,5(10),9(11),14-pentaen-17aβ-ol.

4. The compound in accordance with claim 1, 3-methoxy-8β-methyl, D-homoestra-1,3,5(10),9(11),14-pentaen-17aβ-ol acetate.

5. The compound in accordance with claim 1, 3-methoxy-8β-methyl-D-homo-9ζ-estra-1,3,5(10),14-tetraen-17aβ-ol acetate.

6. The compound in accordance with claim 1, 3-methoxy-8α-methyl-D-homo-9ζ-estra-1,3,5(10),14-tetraen-17aβ-ol.

* * * * *